Figure 1:
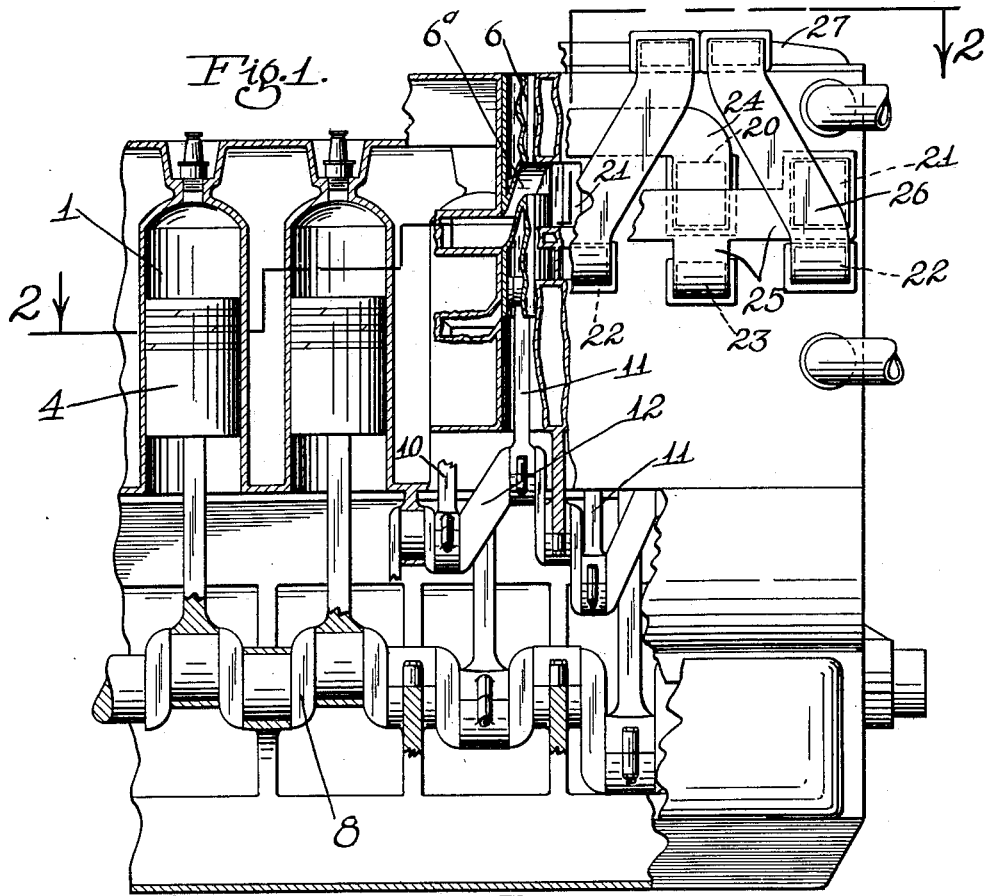

Nov. 14, 1933.                H. J. HICKEY                1,934,710
                        INTERNAL COMBUSTION ENGINE
                    Original Filed Aug. 11, 1930    3 Sheets-Sheet 1

INVENTOR
HENRI J. HICKEY
BY A. B. Bowman
ATTORNEY

Nov. 14, 1933.    H. J. HICKEY    1,934,710
INTERNAL COMBUSTION ENGINE
Original Filed Aug. 11, 1930    3 Sheets—Sheet 2

INVENTOR
HENRI J. HICKEY
BY
A. B. Bowman
ATTORNEY

INVENTOR
HENRI J. HICKEY
BY A. B. Bouma
ATTORNEY

Patented Nov. 14, 1933

1,934,710

UNITED STATES PATENT OFFICE 1,934,710

INTERNAL COMBUSTION ENGINE

Henri J. Hickey, Los Angeles, Calif.

Application August 11, 1930, Serial No. 474,339
Renewed February 3, 1933

13 Claims. (Cl. 123—188)

My present invention relates to internal combustion engines, and more particularly to the four cycle type of gasoline engine, although certain features are applicable also to two cycle engines and to Diesel engines.

The objects of this invention are: first, to provide an internal combustion engine having a novel valve construction, with a plurality of ports and passages; first, whereby a large and sustained valve opening may be had for the intake of fuel gases or air and the scavenging of exhaust gases for increasing the efficiency of this type of engine; second, to provide an engine of this class in which the fuel gases or air are admitted to and the exhaust gases discharged from the combustion cylinder through the same ports in the wall of the combustion cylinder and valves whereby the fuel gases or air are partially preheated and the cylinder valves partially cooled; third, to provide an internal combustion engine in which the combustion cylinder is provided with auxiliary intake and auxiliary exhaust means at the lower portion thereof for discharging a portion of the exhaust gases in the direction of the receding piston at the end of its power stroke and for admitting a final charge of fuel gas or air when the working piston is at the lower end of its intake stroke and immediately before the compression of the fuel gases or air, thus admitting an additional charge of fuel or air at the desired point and time, which is not had in the ordinary engine; fourth, to provide an engine of this class in which the fuel gas or air is injected under pressure into the combustion cylinder through the auxiliary intake means, thus supercharging the combustion cylinder with fuel gas or air; fifth, to provide an engine of this class in which the intake and exhaust ports and passages are opened and closed by piston type valves, and in which one of these valves serves to compress the fuel gas or air for supercharging the combustion cylinder with fuel gas or air; sixth, to provide a novel arrangement of intake ports in a fuel intake valve cylinder and valve piston in said cylinder for admitting fuel gas to the valve cylinder above the piston, preparatory to compressing the fuel gas therein, for injecting the compressed fuel gas in the combustion cylinder; seventh, to provide an engine of this class having an exhaust valve cylinder and piston reciprocally mounted therein in which there is provided a passage through the piston for connecting ports and passages at the opposite sides thereof and in which there is provided a continuous passage from end to end so that there is provided little resistance in the reciprocation of the valve piston; eighth, to provide an internal combustion engine in which each cylinder is provided with an intake and exhaust valve so timed with each other and with the working piston of the cylinder as to control the opening of the main and auxiliary intake and exhaust ports or passages, when the working piston is at the outer and inner ends of its stroke; ninth, to provide as a whole a novelly constructed internal combustion engine for positive and efficient operation and high power efficiency; and, tenth, to provide an engine of this class which is very simple and economical of construction, proportionate to its function, durable, and which will not readily deteriorate or get out of order.

Figure 2:
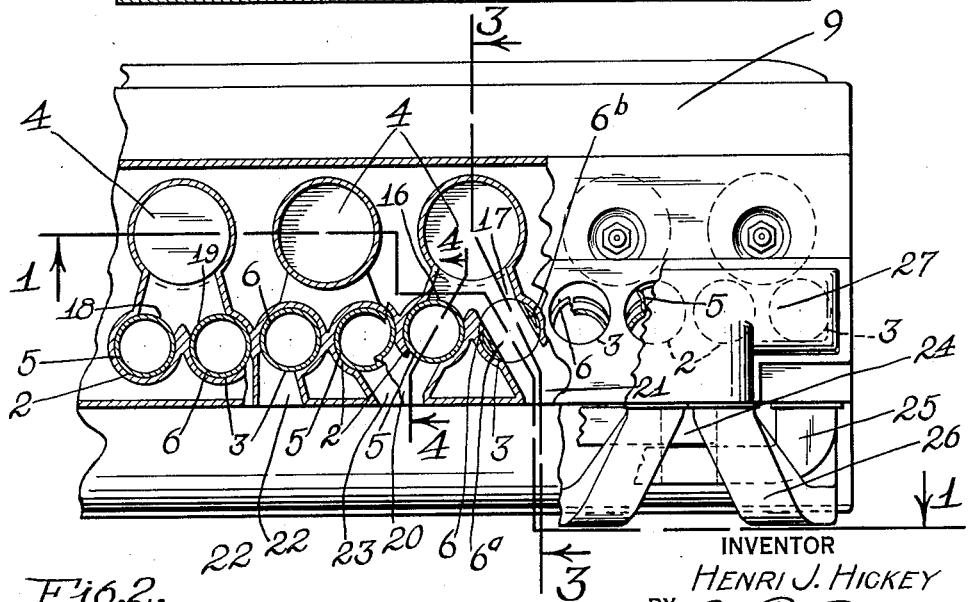
Figure 3:
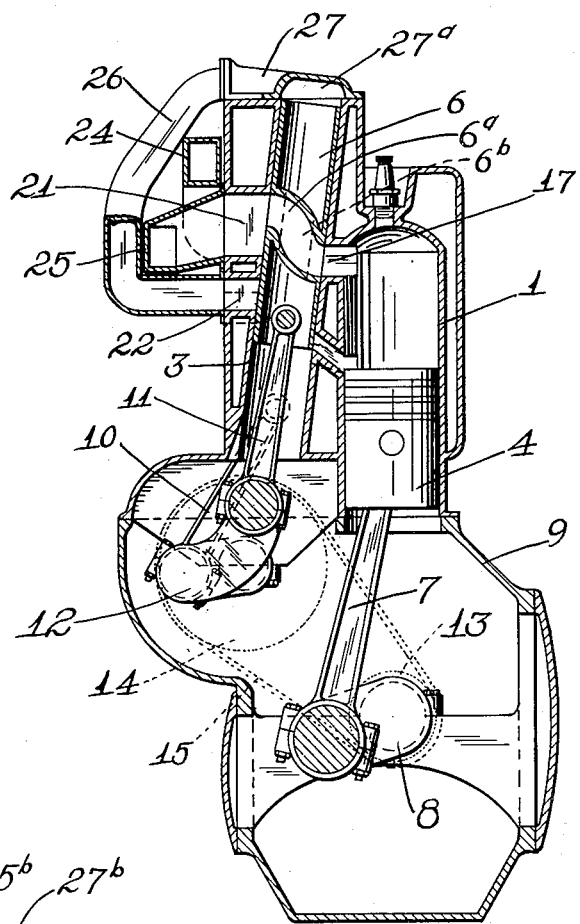
Figures 4, 5:
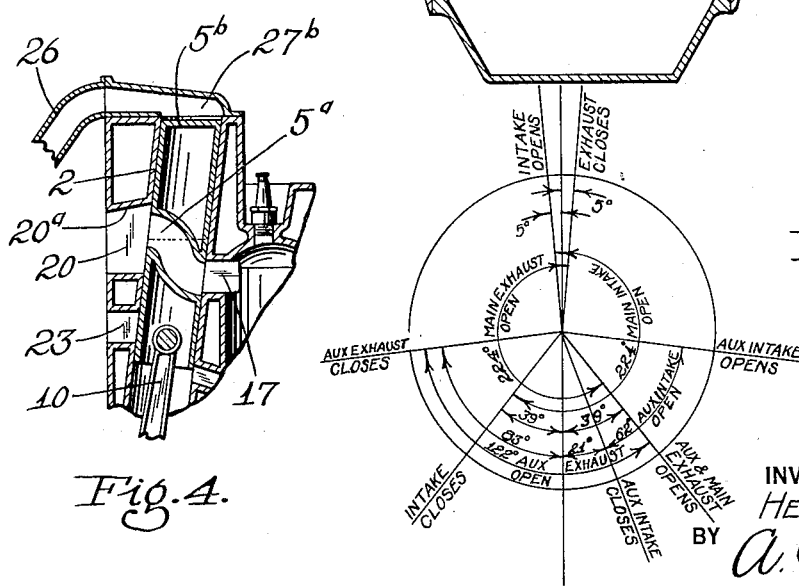

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary side elevational and partial sectional view of my internal combustion engine in one form of construction, the section being taken at 1—1 of Fig. 2; Fig. 2 is a partial plan and partial sectional view thereof taken at 2—2 of Fig. 1; Fig. 3 is a transverse sectional view thereof taken through 3—3 of Fig. 2; Fig. 4 is a fragmentary sectional view thereof taken through 4—4 of Fig. 2 but taken through the intake valve cylinder; Fig. 5 is one form of valve timing diagram for my engine; and Figs. 6, 7, 8 and 9 are developed diagrammatic views of my engine in one form, showing the relative positions of the valve pistons to each other and the working piston, respectively at the beginning of the intake stroke, the beginning of the compression, the beginning of the power stroke, and the beginning of exhaust stroke of the working piston.

Like characters of reference refer to similar parts and portions throughout the views of the drawings.

The combustion or working cylinder 1, the intake valve cylinder 2, and the exhaust valve cylinder 3, of the engine illustrated in the drawings, are cast in a single block, but it is obvious that these cylinders may be separate members appropriately connected together. In the cylinder 1 is reciprocally mounted a conventional piston 4 which is connected by a connecting rod 7 to the main crank shaft 8 rotatably mounted in the crank case 9 of the engine on which the cylinders or engine block is mounted. In the intake and exhaust valve cylinders 2 and 3 are reciprocally mounted, respectively, intake and exhaust valves 5 and 6 which are in the form of long pistons and connected by connecting rods 10 and 11 to a valve operating crank shaft 12. The crank shaft 12 is operated in this instance at one-half engine speed preferably by sprockets 13 and 14 connected, respectively, to the crank shafts 8 and 12, and by a sprocket chain 15, as shown diagrammatically in Fig. 3. The crank shaft 12 is also rotatably mounted in the crank case but considerably above and to one side of the main crank shaft 8. Such mounting of the valve operating crank shaft necessitates the shifting of the axis of the valve operating crank shaft considerably to one side of the combustion cylinder 1. It is desirable, however, that the valve cylinders are positioned as closely as possible to the combustion cylinders so as to reduce the length of the passages connecting the same for the intake and exhausting of gases. The valve cylinders, which are positioned adjacent and parallel to each other and at one side of the corresponding combustion cylinder, are inclined at an angle to that of the combustion cylinder, as shown best in Figs. 3 and 4.

The intake and exhaust valve cylinders 2 and 3 are connected intermediate their ends by passages 16 and 17 with the upper end of the combustion cylinder 1 and terminate in said combustion cylinder in a unitary port or opening, as shown best in Fig. 2. By such relation of intake and exhaust passages, the fuel gases are preheated as they enter the combustion cylinder and the passages are also cooled by said fuel gases. These passages are the main intake and exhaust passages. The intake and exhaust valve cylinders are also connected by auxiliary exhaust and intake passages 18 and 19 with the combustion cylinder 1 and also terminate in the walls of the combustion cylinder in a unitary port, as shown best in Fig. 2, for the purposes above mentioned. The main intake and exhaust passages enter the combustion cylinder normal with the walls thereof, while the auxiliary intake and exhaust passages are inclined slightly downwardly as they enter the combustion cylinder. The openings in the combustion cylinder to the auxiliary intake and exhaust passages are uncovered as the working piston 4 reaches substantially the lower end of its stroke, the working piston forming a part of the valve system in uncovering and covering the auxiliary intake and exhaust passages.

The opposite sides of the valve cylinders from the intake and exhaust passages are connected respectively by relatively wide ports 20 and 21 to the intake and exhaust manifolds 24 and 25 respectively, as shown in Figs. 1 and 3. The exhaust valve cylinder 3 and the intake valve cylinder 2 are also provided at their outer sides, and below the ports 21 and and 20, with other ports 22 and 23, respectively, which are connected to intake manifolds or conductors 26 and the exhaust manifold 25, respectively. It will be here noted that the intake port 22 is connected with the exhaust valve cylinder 3, while the auxiliary exhaust port 23 is connected with the intake valve cylinder 2 for the purposes hereinafter described.

The valve pistons 5 and 6 are relatively long and are provided intermediate their ends with substantially transverse ports 5a and 6a, respectively, which extend from the outer to the inner sides thereof and are adapted to connect, at predetermined periods, the ports and passages above mentioned. The ports 5a and 6a in the valves are inclined downwardly from their outer sides to provide a substantial down draft for the fuel gases when they enter the combustion cylinder. These ports 5a and 6a are in the form of an ogee curve and terminate at the ends in directions substantially normal with the walls of the valve pistons so as to avoid sharp edges at the juncture of the walls of the ports and the walls of the pistons, and to provide smooth passages for the flow of gases.

The exhaust valve piston 6 is open at its lower and upper ends, and is also provided with a vertical passage 6b, as shown in Figs. 2 and 3, between the side walls of the port 6a and the cylindrical wall of the piston, so as to provide a continuous passage from end to end of the piston. Such passage permits the upward and downward flow of air or oil vapors when the exhaust valve piston is reciprocated, and thus reduces the resistance to such reciprocation.

Figure 7:
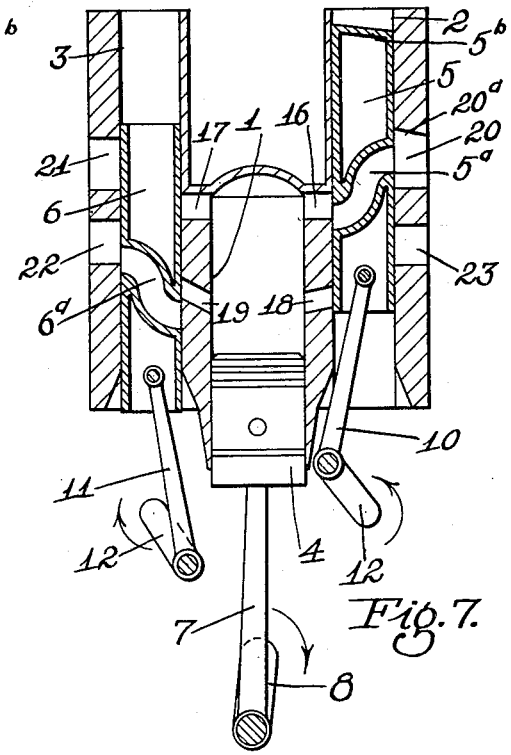

The upper end of the engine block, above the valve cylinders, is enclosed by a cap or manifold 27, which covers and encloses the upper ends of valve cylinders and separates each of the valve cylinders from each other. In this cap 27 and above each of the exhaust valve cylinders are provided recesses 27a, which are completely enclosed but communicate with the exhaust valve cylinders. In this cap, above each of the intake valve cylinders, however, are provided compression chambers 27b, which communicate with the intake valve cylinders 2 at one end and which are connected at their opposite ends to the conductors 26, one of which is provided for each working cylinder. This conductor 26 connects, in this instance, the upper ends or compression chambers of the intake valve cylinders of a working cylinder with the auxiliary intake of the same working cylinder. Fuel or air is admitted through the intake port 20 when the intake valve piston 5 is at the lower end of its stroke, the fuel or air passing above the valve piston. The receding valve piston 5 causes a partial vacuum above the same and consequently a flow of air or gas into the compression chamber 27b. The valve pistons are so timed that when the intake valve piston has reached substantially the upper end of its stroke and has partially compressed the gases therein, the auxiliary intake is opened and these compressed gases or air are injected into the working cylinder at the end of its intake stroke and when the working piston is in its receded position, as shown in Fig. 7. Such admission of auxiliary air or fuel under pressure into the working or power cylinder results in an effective supercharging means.

It will be noted that air may be compressed in the intake valve cylinders for injecting an additional charge of air in oil burning engines, or a charge of air in gasoline engines. In the structure disclosed, however, the additional charge is fuel gas and is received from the same source as the main fuel supply to the engine; and the charge of fuel gas to be compressed in the intake valve cylinders is, in this instance, also received through the main intake port 20. This port 20 is partially uncovered when the intake valve piston 5 reaches the lower end of its stroke, and after a partial vacuum is created in the upper end of the intake valve cylinder, as shown by dotted lines in Figs. 4 and 9. In order to increase the opening from the port 20 to the intake valve cylinder 2, the upper wall of the port 20 is inclined upwardly, as indicated by 20a, in Figs. 6, 7, 8, and 9, and the head, designated 5b, of the intake valve piston 5, is inclined downwardly toward the port 20. This angularly positioned head 5b is also so arranged relative to the compression chamber 27b, so as to reduce the resistance to the flow of compressed gases from the intake valve cylinders to the conductor 26.

Figure 6:
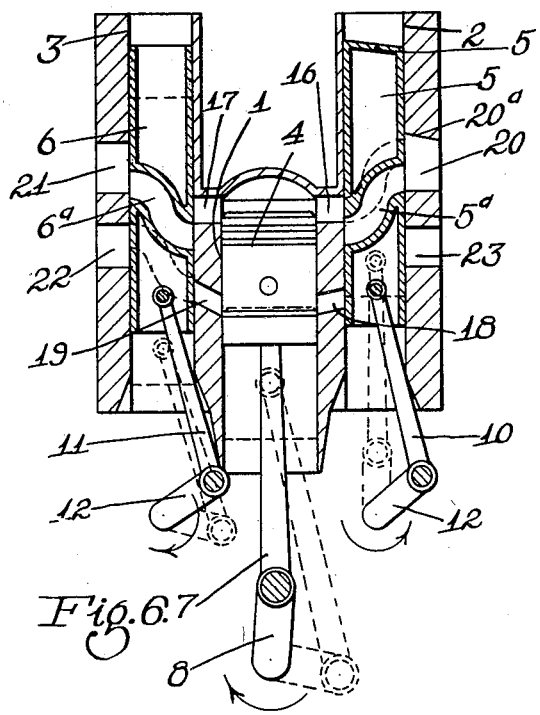

The operation of my engine is as follows, reference being had to Fig. 5 of the drawings showing the timing diagram of the valve openings, and Figs. 6, 7, 8 and 9, showing diagrammatically the cycles of my engine:

The main intake valve opens, in this instance, five degrees before top dead center, the main intake valve opening being effected when the curved port in the intake valve piston registers with the port 20 and the passage 16. Fig. 6 shows the intake valve piston just beginning to register with the passage 16. As the working piston 4 recedes inwardly, the fuel gases are drawn in, the main intake remaining open, as shown in Fig. 7, until the working piston has passed upwardly 39 degrees past lower dead center, as shown in Fig. 5. The auxiliary intake passage 19 is uncovered by the working piston 4 a considerable period before the piston reaches its lower position. In Fig. 7 of the drawings, the port 6a of the exhaust valve piston 6 is shown as just having passed the registered position with the auxiliary intake passage 19, and at a time when the working piston 4 begins to move upwardly. Thus, the auxiliary charge of gas or air is allowed to enter before the compression stroke begins, increasing the pressure in the combustion cylinder to substantially atmospheric pressure; or, when fuel gas or air is injected, by reason of the compression thereof in the compression chamber 27b by the intake valve pistons 5, the pressure is raised considerably above atmospheric pressure before the compression stroke begins, resulting in supercharging of the working cylinder. The auxiliary intake passage 19 is covered by the working piston 4, before the exhaust valve piston is again in registry with the auxiliary intake passage 19. As explained before, the auxiliary charge of fuel gas or air is injected into the working cylinder 1 by being compressed at the upper end of the intake valve cylinder 2. As shown in Fig. 5, the auxiliary intake opens eighty-three degrees before bottom dead center and remains open during a travel of sixty-two degrees of the crankshaft. During the compression stroke of the working piston, all of the ports and passages connected with the working cylinder 1 are closed, except for a short period at the beginning of the compression stroke; at this time the main intake is partially open.

Figure 8:
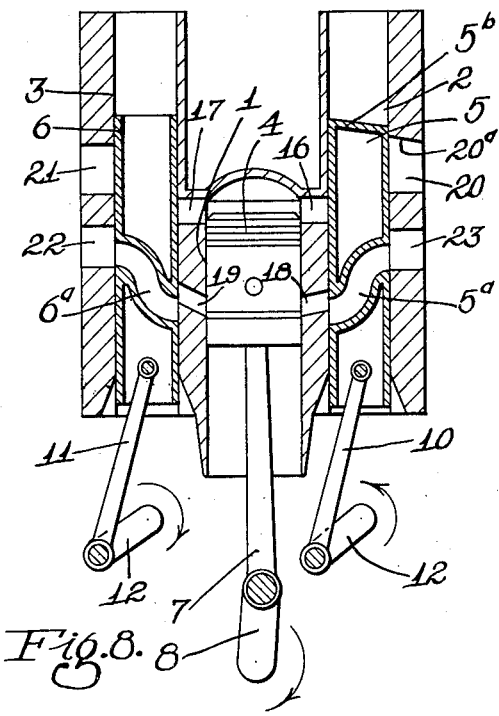
Figure 9:
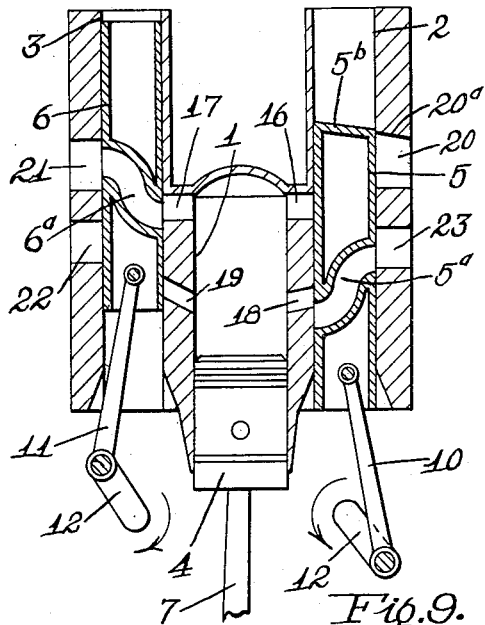

At the beginning of the power stroke, shown diagrammatically in Fig. 8, the main intake and exhaust passages 16 and 17 are closed by the valve pistons 5 and 6. As the working piston 4 reaches the end of its power stroke, the main exhaust passage 17 is connected with the exhaust manifold by the port 6a, in the exhaust valve piston, as shown best in Fig. 9, which shows the beginning of the upward movement or exhaust stroke of the working piston. While the working piston 4 moves downwardly during its power stroke, the port in the intake valve piston 5 is in registry with the auxiliary exhaust passage 18, but this passage is not open for the discharge of exhaust gases until the working piston is near the lower end of its stroke; and, until the working piston reaches substantially the lower end of its power stroke, the auxiliary exhaust passage 18 is covered by the intake valve piston 5. But just before the beginning of the exhaust stroke as shown in Fig. 9, the auxiliary exhaust passage 18 is uncovered by the port in the intake valve piston. The burned or spent gases naturally travel downwardly, and a large portion of these gases are exhausted through the auxiliary exhaust passage 18, while the working piston is at the lower end of its stroke and before this passage is again covered by the working piston. The main exhaust passage 17 remains open until a short period after the exhaust and the working piston has reached top dead center. From Fig. 5, it will be seen that the main exhaust opens thirty-nine degrees before the crankshaft reaches the lower dead center and remains open until five degrees past top dead center, namely, 224 degrees of the travel of the crankshaft. The auxiliary exhaust opens substantially simultaneously with the opening of the main exhaust, but remains open for approximately 122 degrees only, or until the crankshaft has passed the lower dead center 83 degrees. Thus, it will be seen that the pressure in the combustion cylinder is quickly reduced to a pressure only slightly above atmospheric at the end of the power stroke; and the burnt gases are quickly scavenged through both exhaust ports during the exhaust stroke. From this description of the operation, of the cycles, and of the opening and closing of the valves, it will be seen that large valve openings are provided during extended periods, and substantially at the opposite ends of the working cylinder, whereby the greatest possible efficiency and power is obtainable.

Though I have shown and described a particular construction, combination and arrangement of parts and portions of my internal combustion engine, and have shown its application to a gasoline engine, and particularly a four-cycle gasoline engine, I do not wish to be limited to this particular construction, combination and arrangement nor to the particular application of the features of my invention to a gasoline engine of this type, but desire to include in the scope of my invention the construction, combination and arrangement of parts, portions and elements substantially as set forth in the appended claims.

Having thus described my invention, what I claim as new and desire to secure by Letters Patent, is:

1. In an internal combustion engine, a combustion cylinder, an intake valve cylinder, an exhaust valve cylinder, said valve cylinders having respectively main intake and exhaust passages connected to the upper end of the combustion cylinder and also auxiliary exhaust and intake passages connecting the valve cylinders to the lower portion of the combustion cylinder, a working piston reciprocally mounted in the combustion cylinder, and intake and exhaust valve pistons reciprocally mounted respectively in the valve cylinders, each valve piston having a port therethrough, the port in the intake valve piston connecting with the main intake and auxiliary exhaust passages when said valve piston is respectively at its upper and lower position, and the port in the exhaust valve piston connecting with the main exhaust and auxiliary intake passages when the exhaust valve piston is respectively at its upper and lower position.

2. In an internal combustion engine, a cylinder block having a combustion cylinder therein and spaced apart intake and exhaust valve cylinders arranged adjacent the combustion cylinder, and having intake and exhaust ports connected respectively with the intake and exhaust valve cylinders and also passages extending from said valve cylinders and connected to the combustion cylinder in a unitary port, a piston reciprocally mounted in the combustion cylinder, and valves in each of the valve cylinders for connecting at predetermined periods the ports connected to the valve cylinders with the passages connected therewith, said block having auxiliary intake and exhaust ports connected with the valve cylinders below the first mentioned ports, and also provided with auxiliary intake and exhaust passages extending from said valve cylinders and connected with the combustion cylinder in a unitary port, said valves also connecting at predetermined periods said auxiliary intake and exhaust ports with said auxiliary intake and exhaust passages.

3. In an internal combustion engine, a cylinder block having a combustion cylinder and spaced intake and exhaust valve cylinders positioned adjacent the combustion cylinder, said block having main intake and exhaust ports connected respectively with the intake and exhaust valve cylinders and intake and exhaust passages connecting respectively said valve cylinders with the combustion cylinder, said block having also an auxiliary intake port connected with the exhaust valve cylinder and a corresponding passage connecting said exhaust valve cylinder to the combustion cylinder, and also having an auxiliary exhaust port connected to the intake valve cylinder and a corresponding passage connecting the latter cylinder to the combustion cylinder, an operating piston reciprocally mounted in the combustion cylinder, and valve pistons reciprocally mounted in the valve cylinders.

4. In an internal combustion engine, a combustion cylinder, an intake valve cylinder, an exhaust valve cylinder, said valve cylinders being arranged adjacent each other and adjacent the combustion cylinder and having respectively main intake and exhaust passages connected to the upper end of the combustion cylinder and main intake and exhaust ports connected respectively to the valve cylinders, a working piston reciprocally mounted in the combustion cylinder, an intake valve piston reciprocally mounted in the intake valve cylinder, and an exhaust valve piston reciprocally mounted in the exhaust valve cylinder, said intake valve cylinder being connected by an auxiliary exhaust passage to the combustion cylinder below the first passages and having an exhaust port connected thereto adapted to register with the auxiliary exhaust passage, said exhaust valve cylinder being also connected by an auxiliary intake passage with the combustion cylinder below the first mentioned passages and also having an auxiliary intake port adapted to register with the auxiliary intake passage, said valve pistons having ports therethrough, the port in the intake valve piston connecting the first mentioned intake ports and passages when the intake valve piston and the working piston are at the upper ends of their strokes and the port in the exhaust valve piston connecting the auxiliary intake port with the auxiliary intake passage when the exhaust valve piston and the working piston are substantially at the lower ends of their strokes, the port in the exhaust valve piston being adapted to connect the first mentioned exhaust port with the first mentioned exhaust passage when the exhaust valve piston is at the upper end of its stroke and the working piston is at the lower end of its exhaust stroke simultaneously with the connection of the port in the intake valve cylinder with the auxiliary exhaust port and the auxiliary exhaust passage when the intake valve piston is substantially at the lower end of its stroke.

5. In an internal combustion engine, a combustion cylinder, an intake valve cylinder, an exhaust valve cylinder, said valve cylinders being arranged adjacent each other and adjacent the combustion cylinder and having respectively main intake and exhaust passages connected to the upper end of the combustion cylinder and main intake and exhaust ports connected respectively to the valve cylinders, said valve cylinders having also auxiliary passages below the first passages connecting the valve cylinders to the combustion cylinder, said valve cylinders having also auxiliary ports connected therewith below the first mentioned ports, a working piston reciprocally mounted in the combustion cylinder, and valve pistons reciprocally mounted in the valve cylinders, said valve pistons having ports therethrough adapted, when the valve pistons are at the upper ends of their strokes, to connect the first mentioned ports to the first mentioned passages and, when substantially at the lower ends of their strokes, to connect the second ports to the second passages, the first mentioned intake and exhaust passages being connected with the combustion cylinder in a unitary port and the auxiliary intake and exhaust passages connecting with the combustion cylinder in a second unitary port and adapted to be uncovered when the working piston is substantially at the lower end of its stroke.

6. In an internal combustion engine, a combustion cylinder, and a valve cylinder at one side thereof and adjacent thereto, there being provided a passage connecting the valve cylinder to the combustion cylinder at the upper portion of the latter, a working piston reciprocally mounted in the combustion cylinder, a valve piston reciprocally mounted in the valve cylinder, the valve cylinder having a compression chamber at its upper end, and a conductor connecting the compression chamber with the combustion cylinder.

7. In an internal combustion engine, a combustion cylinder, and a valve cylinder at one side thereof and adjacent thereto, there being provided a passage connecting the valve cylinder to the combustion cylinder at the upper portion of the latter, a working piston reciprocally mounted in the combustion cylinder, a valve piston reciprocally mounted in the valve cylinder, the valve cylinder having a compression chamber at its upper end, and a conductor connecting the compression chamber with the lower portion of the combustion cylinder when the working piston is substantially at the lower end of its stroke.

8. In an internal combustion engine, a combustion cylinder, and a valve cylinder at one side thereof and adjacent thereto, there being provided a passage connecting the valve cylinder to the combustion cylinder at the upper portion of the latter, a working piston reciprocally mounted in the combustion cylinder, a valve piston reciprocally mounted in the valve cylinder, the valve cylinder having a compression chamber at its upper end, and a conductor connecting the compression chamber with the combustion cylinder, said valve cylinder having a fuel intake port adapted to connect with the upper passage when the valve piston is at the upper end of its stroke and adapted to be uncovered when the valve piston is at the lower end of its stroke for admitting fuel to the upper end of the valve cylinder and to the compression chamber.

9. In an internal combustion engine, a combustion cylinder, intake and exhaust valve cylinders positioned adjacent each other and adjacent the combustion cylinder, there being provided main intake and exhaust ports connected respectively with the intake and exhaust valve cylinders and intake and exhaust passages connecting respectively said valve cylinders with the combustion cylinder, there being also provided an auxiliary intake port connected with the exhaust valve cylinder and a corresponding passage connecting said exhaust valve cylinder with the combustion cylinder, and an auxiliary exhaust port connected to the intake valve cylinder and a corresponding passage connecting the latter cylinder with the combustion cylinder, an operating piston reciprocally mounted in the combustion cylinder, and valve pistons reciprocally mounted in the valve cylinders, said valve pistons being adapted to connect respectively said ports and passages when the valve pistons are at the upper and lower ends of their strokes, one of said valve cylinders having a compression chamber at the upper end thereof for compressing a gas, said compression chamber being connected to said auxiliary intake port.

10. In an internal combustion engine, a combustion cylinder, intake and exhaust valve cylinders positioned adjacent each other and adjacent the combustion cylinder, there being provided main intake and exhaust ports connected respectively with the intake and exhaust valve cylinders and intake and exhaust passages connecting respectively said valve cylinders with the combustion cylinder, there being also provided an auxiliary intake port connected with the exhaust valve cylinder and a corresponding passage connecting said exhaust valve cylinder with the combustion cylinder, and an auxiliary exhaust port connected to the intake valve cylinder and a corresponding passage connecting the latter cylinder with the combustion cylinder, an operating piston reciprocally mounted in the combustion cylinder, and valve pistons reciprocally mounted in the valve cylinders, said valve pistons being adapted to connect respectively said ports and passages when the valve pistons are at the upper and lower ends of their strokes, one of said valve cylinders having a compression chamber at the upper end thereof for compressing a gas, said compression chamber being connected to said auxiliary intake port, said auxiliary intake and exhaust passages being connected with the lower portion of the combustion chamber and adapted to be uncovered when the working piston is at the lower end of its stroke.

11. In an internal combustion engine, a combustion cylinder, intake and exhaust valve cylinders positioned adjacent each other and adjacent the combustion cylinder, there being provided main intake and exhaust ports connected respectively with the intake and exhaust valve cylinders and intake and exhaust passages connecting respectively said valve cylinders with the combustion cylinder, there being also provided an auxiliary intake port connected with the exhaust valve cylinder and a corresponding passage connecting said exhaust valve cylinder with the combustion cylinder, and an auxiliary exhaust port connected to the intake valve cylinder and a corresponding passage connecting the latter cylinder with the combustion cylinder, an operating piston reciprocally mounted in the combustion cylinder, and valve pistons reciprocally mounted in the valve cylinders, said valve pistons being adapted to connect respectively said ports and passages when the valve pistons are at the upper and lower ends of their strokes, said intake valve cylinder having a compression chamber at the upper end thereof and connected to the auxiliary intake port connected to the exhaust valve cylinder and adapted to be connected to the lower portion of the combustion cylinder when the exhaust valve piston is substantially at the lower end of its stroke.

12. In an internal combustion engine, a combustion cylinder, intake and exhaust valve cylinders positioned adjacent each other and adjacent the combustion cylinder, there being provided main intake and exhaust ports connected respectively with the intake and exhaust valve cylinders and intake and exhaust passages connecting respectively said valve cylinders with the combustion cylinder, there being also provided an auxiliary intake port connected with the exhaust valve cylinder and a corresponding passage connecting said exhaust valve cylinder with the combustion cylinder, and an auxiliary exhaust port connected to the intake valve cylinder and a corresponding passages connecting the latter cylinder with the combustion cylinder, an operating piston reciprocally mounted in the combustion cylinder, and valve pistons reciprocally mounted in the valve cylinders, said valve pistons being adapted to connect respectively said ports and passages when the valve pistons are at the upper and lower ends of their strokes, said intake valve cylinder having a compression chamber at the upper end thereof and connected to the auxiliary intake port connected to the exhaust valve cylinder and adapted to be connected to the lower portion of the combustion cylinder when the exhaust valve piston is substantially at the lower end of its stroke, the main intake port connected with the intake valve cylinder being uncovered when the intake valve piston is at the lower end of its stroke for admitting fuel gas to the upper portion of the intake valve cylinder and to the compression chamber.

13. In an internal combustion engine, a combustion cylinder, intake and exhaust valve cylinders positioned adjacent each other and adjacent the combustion cylinders, there being provided main intake and exhaust ports connected respectively to the intake and exhaust valve cylinders and intake and exhaust passages connecting respectively said valve cylinders with the combustion cylinder, there being also provided an auxiliary intake port connected to the exhaust valve cylinder and a corresponding passage connecting said exhaust valve cylinder with the combustion cylinder, an operating piston reciprocally mounted in the combustion cylinder, and intake and exhaust valve pistons reciprocally mounted respectively in the valve cylinders and adapted to connect respectively said ports and passages connecting said valve cylinders to the combustion cylinder, one of said valve cylinders having a compression chamber at the upper end thereof and connected to said auxiliary intake port, and the valve piston, mounted in said valve cylinder, having a head at its upper end, the other valve piston having an air passage from end to end therein for reducing resistance to its reciprocation.

HENRI J. HICKEY.